United States Patent
Moore

(10) Patent No.: US 9,712,704 B2
(45) Date of Patent: Jul. 18, 2017

(54) SCANNER PROVIDING CENTERED ALIGNMENT MARKS

(71) Applicant: Xerox Corporation, Norwalk, CT (US)

(72) Inventor: Lee Coy Moore, Penfield, NY (US)

(73) Assignee: Xerox Corporation, Norwalk, CT (US)

( * ) Notice: Subject to any disclaimer, the term of this patent is extended or adjusted under 35 U.S.C. 154(b) by 0 days.

(21) Appl. No.: 14/831,962

(22) Filed: Aug. 21, 2015

(65) Prior Publication Data

US 2017/0054863 A1  Feb. 23, 2017

(51) Int. Cl.
*G06F 3/12* (2006.01)
*H04N 1/00* (2006.01)
*H04N 1/04* (2006.01)

(52) U.S. Cl.
CPC ..... *H04N 1/00761* (2013.01); *H04N 1/00413* (2013.01); *H04N 1/00482* (2013.01); *H04N 1/00702* (2013.01); *H04N 1/00734* (2013.01)

(58) Field of Classification Search
CPC ........... H04N 1/00761; H04N 1/00734; H04N 1/00702; H04N 1/00482; H04N 1/00413; H04N 1/00379; H04N 1/0066; G03G 15/5025; G03G 15/607
USPC ............... 358/1.11–1.18, 488; 399/16, 361, 399/365–379; 271/255
See application file for complete search history.

(56) References Cited

U.S. PATENT DOCUMENTS

| | | | |
|---|---|---|---|
| 4,514,063 A * | 4/1985 | Wang | H04N 1/1013 353/101 |
| 4,933,778 A | 6/1990 | Tufano et al. | |
| 5,663,806 A * | 9/1997 | Grise | H04N 1/047 358/406 |
| 6,101,291 A | 8/2000 | Arney et al. | |
| 6,177,982 B1 | 1/2001 | Snyder et al. | |
| 6,470,099 B1 | 10/2002 | Dowdy et al. | |
| 7,423,786 B2 | 9/2008 | Khovaylo | |
| 7,518,762 B2 | 4/2009 | Budelsky et al. | |
| 8,520,266 B2 | 8/2013 | Elliot et al. | |
| 2001/0016084 A1* | 8/2001 | Pollard | H04N 1/107 382/317 |
| 2003/0038227 A1* | 2/2003 | Sesek | H01L 27/146 250/208.1 |
| 2004/0128102 A1* | 7/2004 | Petty | G01S 17/875 702/150 |
| 2008/0056789 A1* | 3/2008 | Moore | G03G 15/5025 399/379 |
| 2008/0231914 A1* | 9/2008 | Motoyoshi | H04N 1/00411 358/474 |
| 2008/0260210 A1* | 10/2008 | Kobeli | G09B 21/006 382/114 |
| 2010/0135707 A1* | 6/2010 | Moore | G03G 15/607 399/379 |
| 2011/0199636 A1* | 8/2011 | Katsuda | G03B 21/26 358/1.15 |

* cited by examiner

*Primary Examiner* — Chad Dickerson

(74) *Attorney, Agent, or Firm* — Gibb & Riley, LLC

(57) ABSTRACT

A scanner includes a platen having a surface supporting items for scanning, and a projector adjacent (e.g., above or below) the platen. The projector projects light displaying patterned alignment marks on the items located on the platen. The patterned alignment marks identify an alignment position for the items to be located on the platen for properly aligned scanning. The projector projects different patterned alignment marks based on different characteristics of different items to be scanned.

9 Claims, 10 Drawing Sheets

SCANNER PROVIDING CENTERED ALIGNMENT MARKS

BACKGROUND

Devices herein generally relate to scanning and printing equipment and more particularly to alignment markings used to align items on the platen of scanning devices.

It can be difficult to copy a small picture or illustration on a multi-function device using a scanner, or to aesthetically align the image content on the scanner platen because the content is placed face down on the glass and thus is not directly viewable by the operator. Also, there are times when multi-generational copies will have badly skewed content. Copying these pages by aligning the edge of the sheet to the edge of the scanner will perpetuate the skew, which is not desirable. In such cases, trial and error iterations of item placement on the platen, followed by test copies are often performed until the image content has the desired alignment on the output page.

SUMMARY

An exemplary scanner herein comprises a platen having a surface supporting items for scanning, and a projector adjacent (e.g., above or below) the platen. The projector projects light displaying patterned alignment marks on the items located on the platen. The patterned alignment marks identify an alignment position for the items to be located on the platen for properly aligned scanning. The projector projects different patterned alignment marks based on different characteristics of different items to be scanned.

In greater detail, one exemplary scanner herein includes a transparent platen having an exterior side and an interior side opposing each other. The exterior side of the platen faces the exterior area of the scanner where items are positioned for scanning, and the interior side of the platen faces the interior area of the scanner. An optical detector is adjacent the transparent platen in a position to optically scan the items positioned on the transparent platen for scanning.

A projector is positioned in the interior area of the scanner adjacent the transparent platen. The projector projects human-visible light displaying patterned alignment marks either from the interior of the scanner through the transparent platen and through the bottom of translucent items on the exterior side of the platen, or from the exterior of the scanner onto the top of items on the exterior side of the platen. The patterned alignment marks identify an alignment position for the items to be located on the transparent platen so as to be aligned with the optical detector for properly aligned scanning. The projector does not project the light displaying the patterned alignment marks when the optical detector is optically scanning the items positioned on the exterior side of the platen.

The projector projects different patterned alignment marks based on different characteristics of different translucent items to be scanned. In one example, the scanner can include a graphic user interface displaying a menu of the different patterned alignment marks. A selection from the menu causes the projector to display the selected one of the different patterned alignment marks.

In some examples, the alignment marks can include a line crossing the transparent platen demarking a center alignment location of the translucent items to be scanned, an intersection of horizontal and vertical lines demarking a center alignment location of the translucent items to be scanned, a plurality of intersections of horizontal and vertical lines demarking a plurality of center alignment locations, curved lines demarking alignment locations, etc.

These and other features are described in, or are apparent from, the following detailed description.

BRIEF DESCRIPTION OF THE DRAWINGS

Various exemplary devices are described in detail below, with reference to the attached drawing figures, in which.

DETAILED DESCRIPTION

Figure 1:
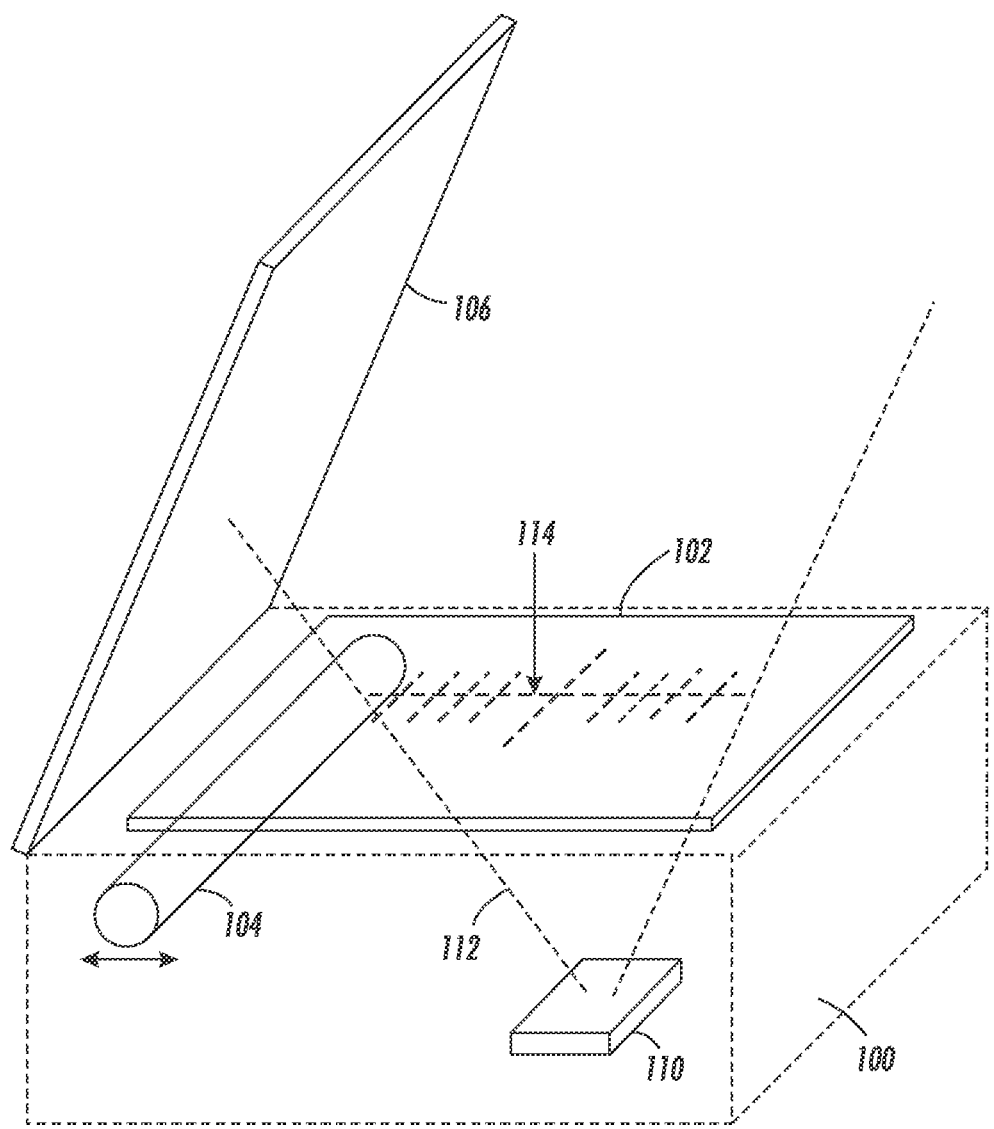
FIG. 1 is a perspective-view schematic diagram illustrating scanning devices herein.

As mentioned above, users often resort to wasteful trial and error iterations of item placement on the platen, followed by test copies until the image content has the desired alignment on the output page. For example, original paper documents can have images on them that are not quite square with the paper, or a document may have been previously copied without careful placement on the platen. If a next generation copy is to be made, the operator may wish to straighten-out the skewed image. Also, sometimes, users desire to copy an original that is much smaller than the area that is to be scanned, such as copying a small newspaper clipping or small cards. It is desirable to place the small original on the platen so that it is centered and squared to the edges, and to help in this situation, the scanners described herein provide a real-time way of aligning the smaller items on the platen so that an aligned image is produced the first time, without resorting to trial and error.

More specifically, the devices herein provide alignment marks as an aid to laying-out the source content on the platen. The scanners herein illuminate the item from either above or below (or both) so that proper alignment can be made. For example, the scanners herein can project reticles from above or below to illuminate the items on the scanner (e.g., and provide a back lit pattern through the translucent paper surface). The projected pattern can be selected by the user, based on the content/desired layout to be aligned. Thus, with scanners herein, the user can select one pattern to center the source content of a paper, while using another pattern for two columns from a newspaper. The alignment marks can include different colored zones using bright light sources, such as lasers, from below or above.

The patterns of markings take into account the requested image magnification, page size, and original orientation settings. Additionally, the user can adjustment the patterns themselves, using various menu controls including magnification, units (metric/imperial/decimal imperial/picas/printer's points . . . ), gutter size, recto or verso side of the page, etc.

As shown in FIGS. 1-5, one exemplary scanner 100 herein includes a transparent platen 102 having an exterior side 103 and an interior side 101 opposing each other. The exterior side 103 of the platen 102 faces the exterior area of the scanner 100 where items 120 are positioned for scanning, and the interior side 101 of the platen 102 faces the interior area of the scanner 100. The platen 102 is covered by a closable lid or cover 106 (which can be a document handler in some devices, as discussed below).

An optical detector 104 is positioned adjacent the transparent platen 102 in a position to optically scan the items 120 positioned on the transparent platen 102 for scanning. For example, the optical detector 104 can move in the direction indicated by the double arrow line in the drawings when scanning items that are positioned on the platen 102. The optical detector 104 is generally positioned at a home position (at one extreme end of the platen 102) when not scanning, leaving space for a projector 110 to project alignment marks 114.

Figure 2:
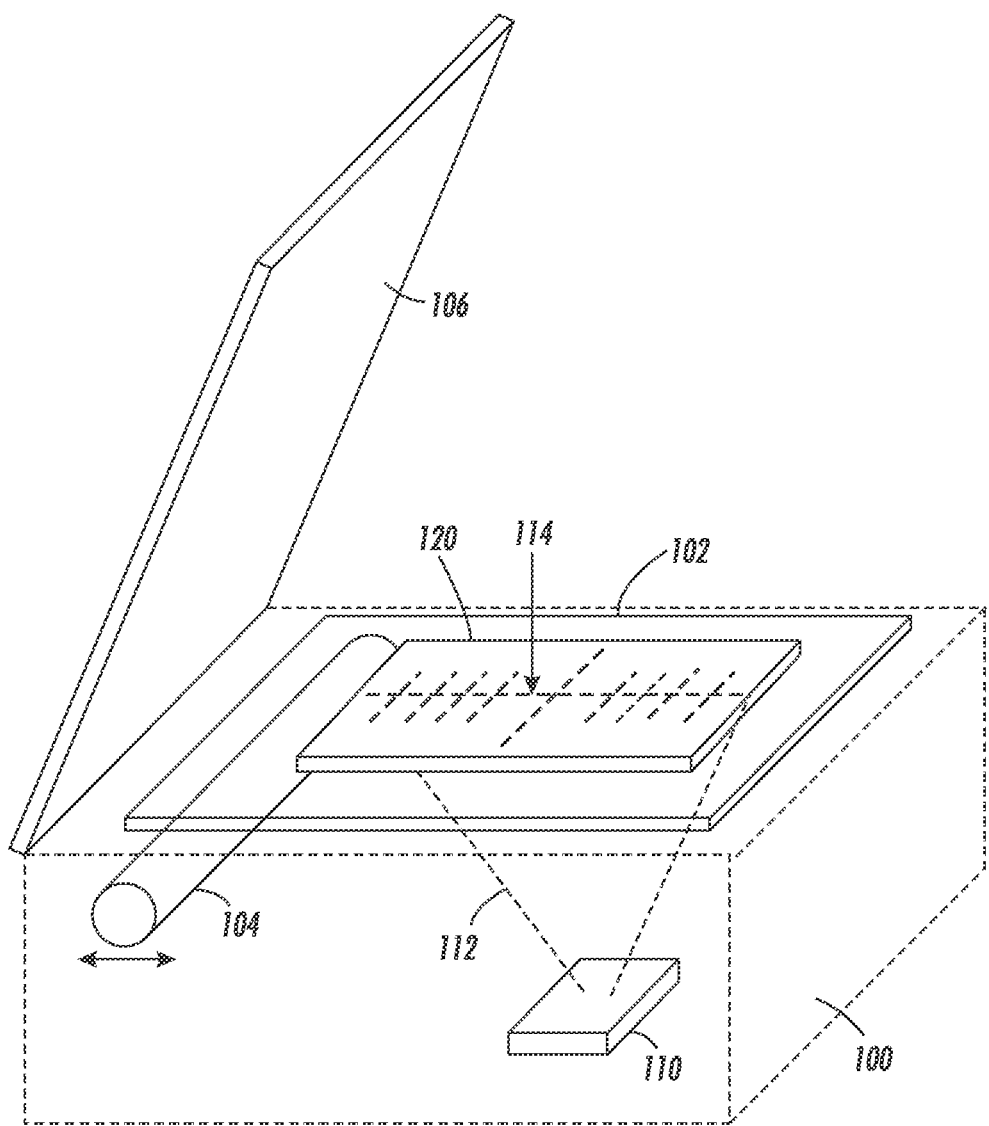
FIG. 2 is a perspective-view schematic diagram illustrating scanning devices herein.
Figure 3:
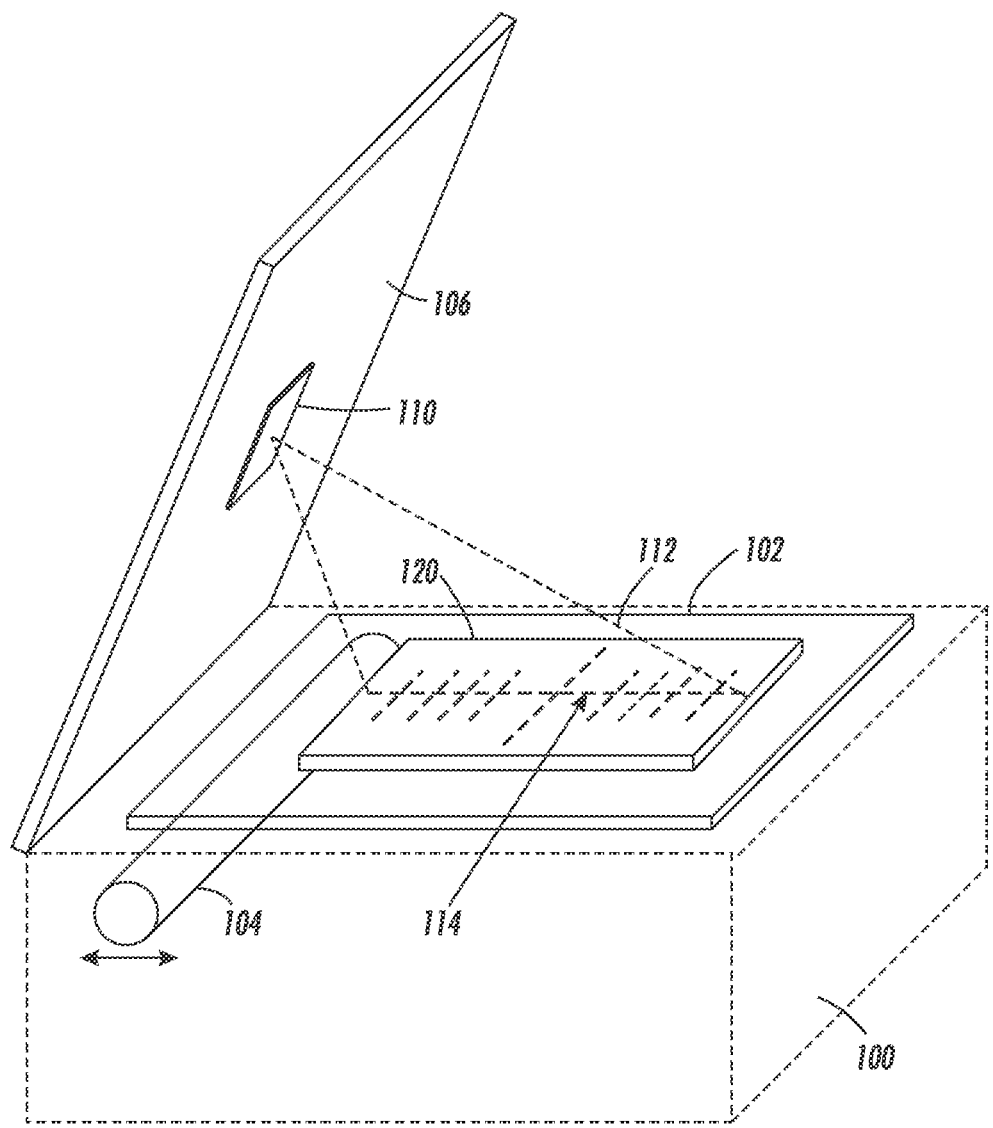
FIG. 3 is a perspective-view schematic diagram illustrating scanning devices herein.
Figure 4:
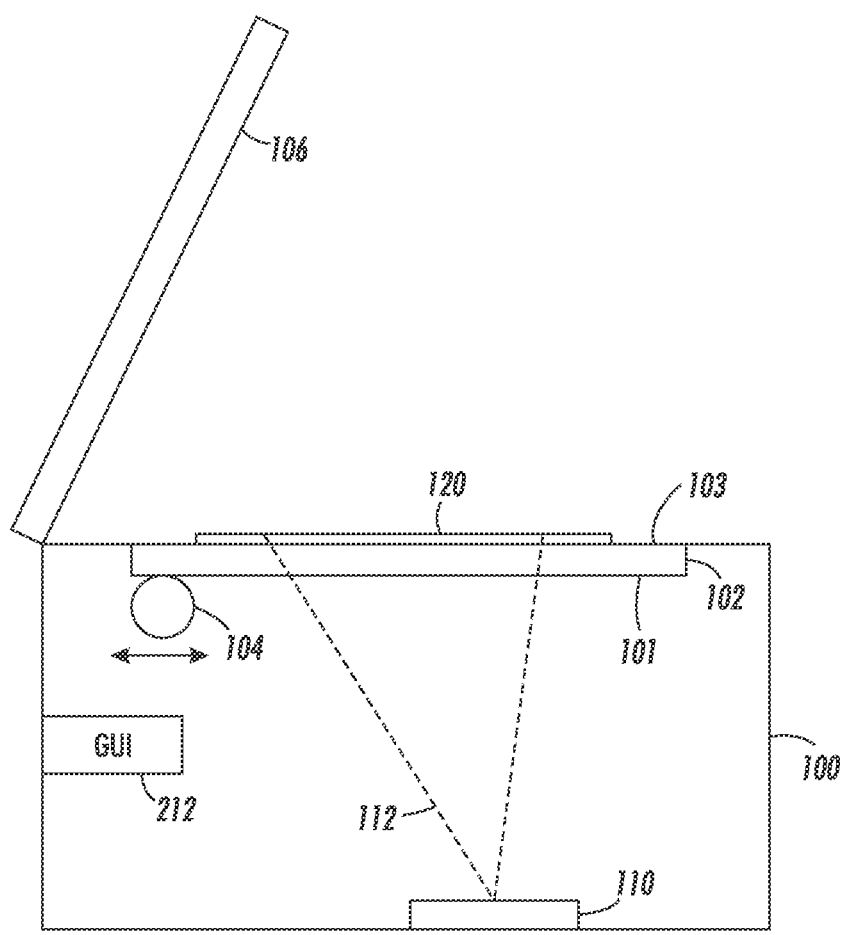
FIG. 4 is a side-view schematic diagram illustrating scanning devices herein.
Figure 5:
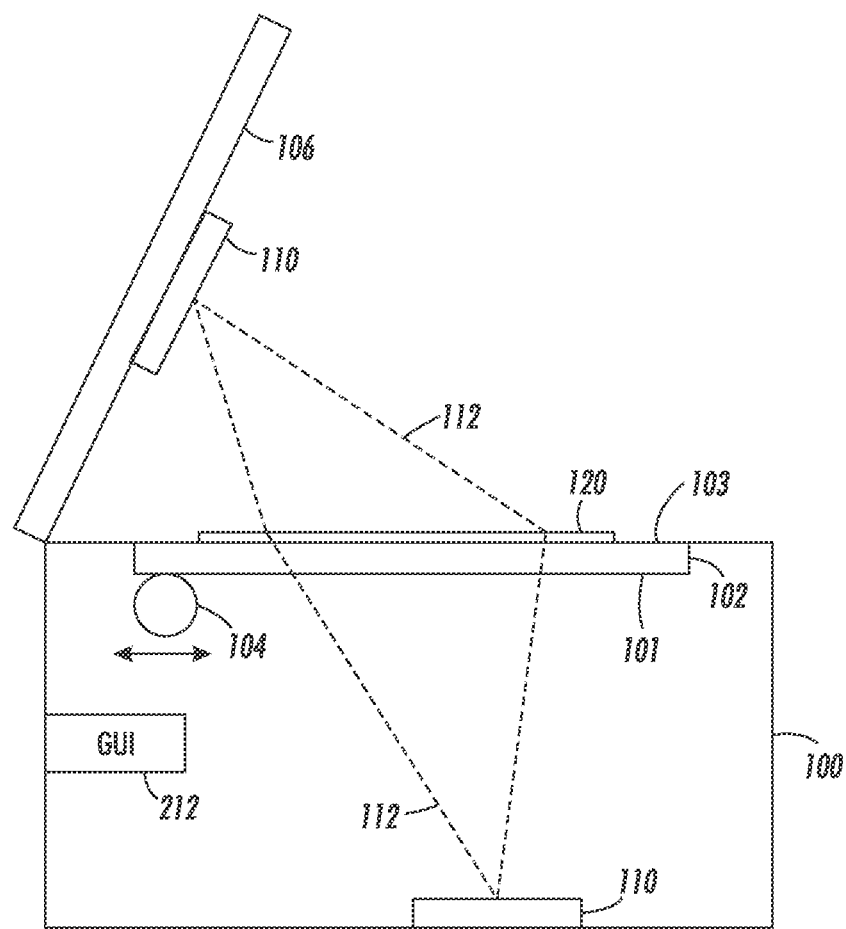
FIG. 5 is a side-view schematic diagram illustrating scanning devices herein.

More specifically, the projector 110 is positioned in the interior area of the scanner 100 adjacent the transparent platen 102, as shown in FIGS. 1, 2, 4, and 5; and/or positioned exterior the scanner 100, as shown in FIGS. 3 and 5 (e.g., projector 110 attached to the scanner lid 106 or other convenient exterior location). Note that FIG. 5 illustrates a structure that includes both an interior projector and an exterior projector that can be used independently or together in combination. Also, FIGS. 4 and 5 illustrate a graphic user interface (GUI) 212 that can be included as part of the scanner 100.

As shown by dashed lines, the projector 110 projects human-visible light 112 displaying patterned alignment marks 114 either from the interior of the scanner 100 through the transparent platen 102 and through the bottom of translucent items 120 on the exterior side 103 of the platen 102, or from the exterior of the scanner 100 onto the top of items 120 on the exterior side 103 of the platen 102.

Specifically, FIG. 1 illustrates no items on the platen 102 to show how the alignment marks 114 appear on the scanner itself. For example, the light 112 may be reflected by coating materials on the platen, dust or scratches on the platen 102, etc., to help a user initially place an item on the platen 102.

FIGS. 2-3 illustrate an item 120 that is a sheet of paper. In FIG. 2, the light 112 projects through the sheet of paper 120, because paper is generally translucent. FIG. 3 projects the light 112 from the exterior of the platen 102, thereby directly projecting the patterned alignment marks 114 on the item 120.

The patterned alignment marks 114 identify an alignment position for the items 120 to be located on the transparent platen 102 so as to be aligned with the optical detector 104 for properly aligned scanning. The projector 110 does not project the light 112 displaying the patterned alignment marks 114 when the optical detector 104 is optically scanning the items 120 positioned on the exterior side 103 of the platen 102, to avoid interfering with the scanning operation of the optical detector 104. In other words, the projector 110 only projects light 112 when the optical detector 104 is in the home position (non-scanning position).

The projector 110 projects different patterned alignment marks 114 based on different layout characteristics of different, potentially translucent, items 120 to be scanned. In one example, the scanner 100 can include a graphic user interface displaying a menu of the different patterned alignment marks 114. A selection from the menu causes the projector 110 to display the selected one of the different patterned alignment marks 114.

Figure 6:
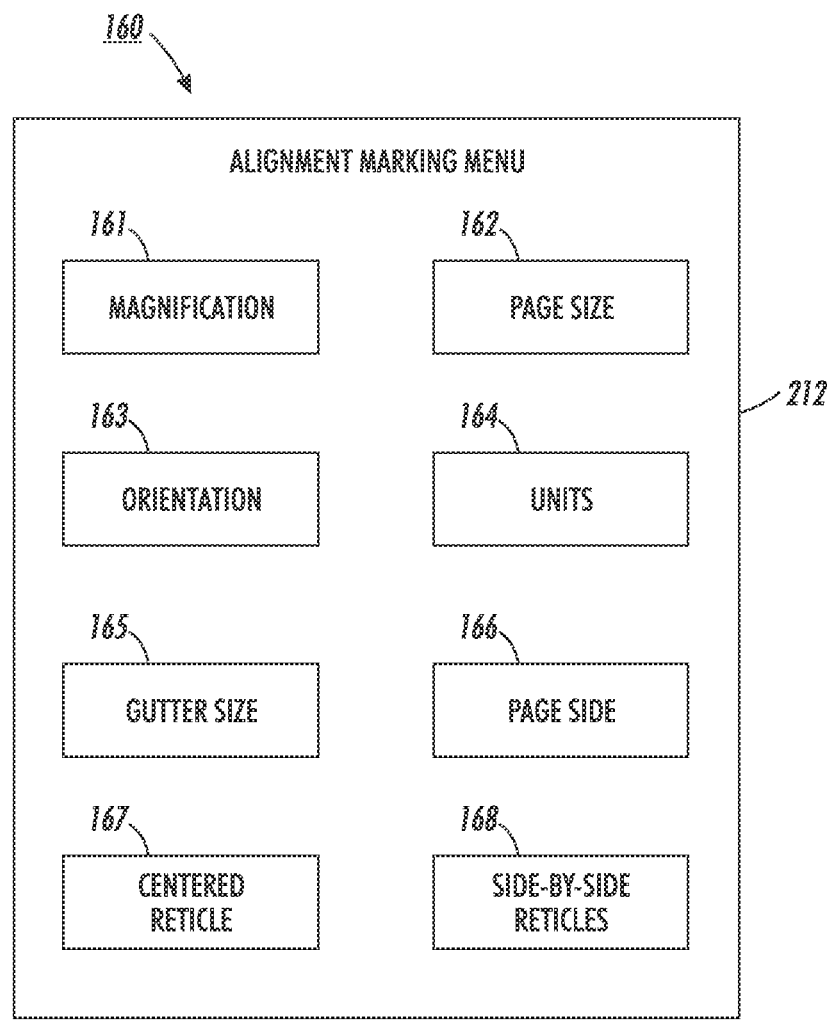
FIG. 6 is a schematic diagram of an alignment marking menu provided by devices herein.

More specifically, as shown in FIG. 6, an exemplary alignment marking menu 160 can be displayed on a graphic user interface. The menu 160 can have menu selection options that are selectable by the user that include (but are not limited to) parameter adjustment options, such as an option to request an amount of magnification 161, page size 162, orientation settings 163, units (metric/imperial/decimal imperial/picas/printer's points . . . ) 164, gutter size 165, recto or verso side of the page 166, etc., pattern selection menu options, such as a centered reticle 167 (FIG. 7), side-by-side reticles 168 (FIG. 8), etc. Therefore, as shown in FIG. 6, the devices herein provide the ability to adjust parameters of the pattern, such as scale, gutters, orientation, and verso-recto (as in greeting cards) and can do so based on user menu selection.

FIGS. 7-12 illustrate some exemplary patterns of alignment marks 114 that can be projected by scanning devices herein. In some examples, the alignment marks 114 can include a line crossing the transparent platen 102 demarking a center alignment location of the translucent items 120 to be scanned, an intersection of horizontal and vertical lines demarking a center alignment location of the translucent items 120 to be scanned, a plurality of intersections of horizontal and vertical lines demarking a plurality of center alignment locations, curved lines demarking alignment locations, etc. As would be understood by those ordinarily skilled in the art, FIGS. 7-12 are only non-limiting examples and other patterns of alignment marks could be produced by scanning devices herein.

Figure 7:
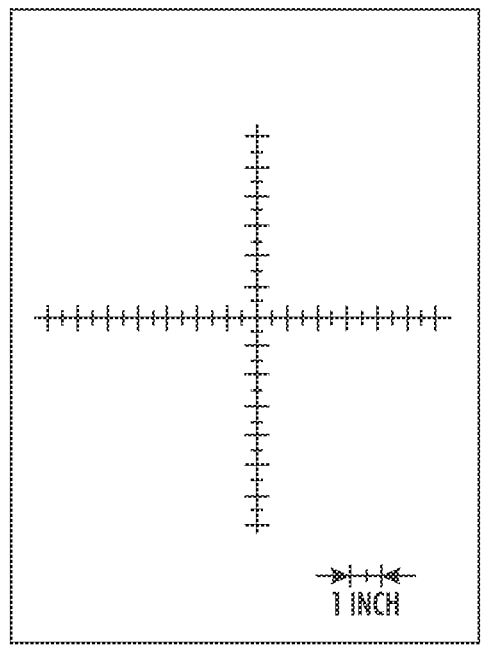
FIG. 7 is an exemplary pattern of marks provided by devices herein.
Figure 8:
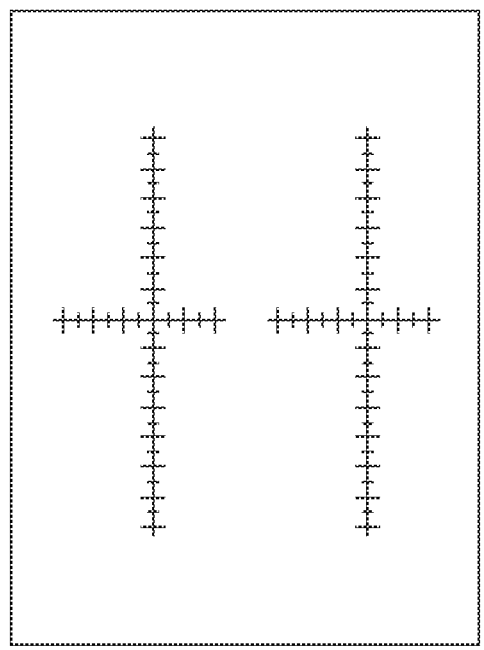
FIG. 8 is an exemplary pattern of marks provided by devices herein.
Figure 9:
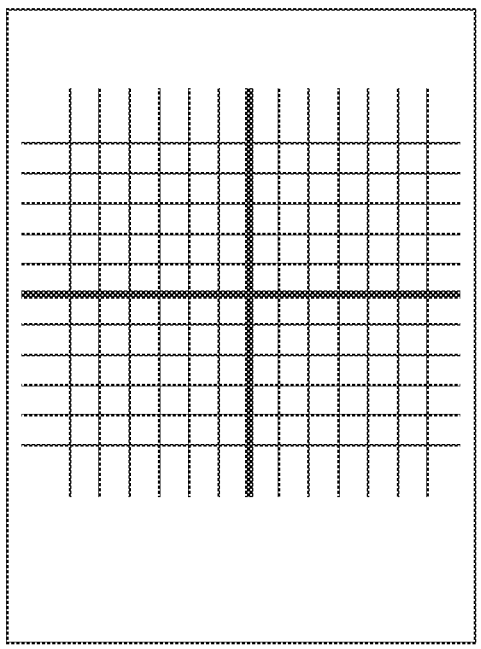
FIG. 9 is an exemplary pattern of marks provided by devices herein.
Figure 10:
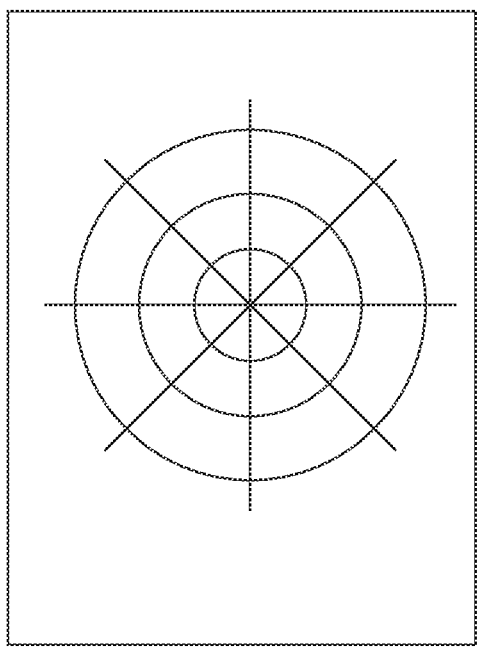
FIG. 10 is an exemplary pattern of marks provided by devices herein.
Figure 11:
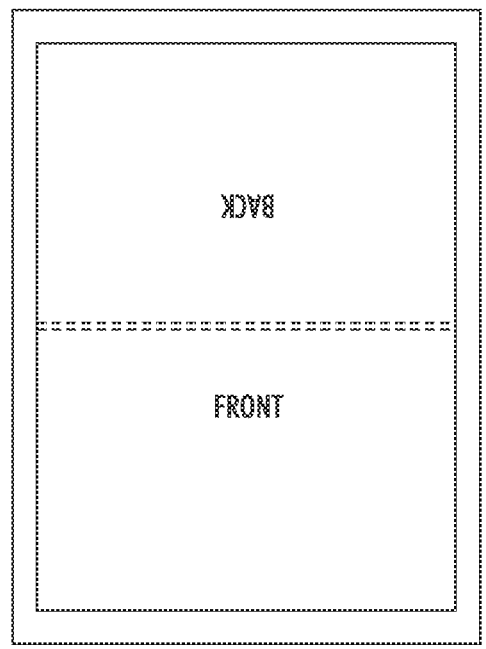
FIG. 11 is an exemplary pattern of marks provided by devices herein.

More specifically, FIG. 7 illustrates an exemplary pattern of marks (e.g., a reticle) provided by devices using the 1-Up layout. FIG. 8 shows a similar exemplary pattern of marks using the 2-Up layout (e.g., side-by-side reticles). FIG. 9 demonstrates a grid style layout composed of 4 quadrants. FIG. 10 demonstrates a circular layout for arranging items in a circle. Furthermore, FIG. 11 demonstrates a layout for a 5×7 greeting card.

Figure 12:
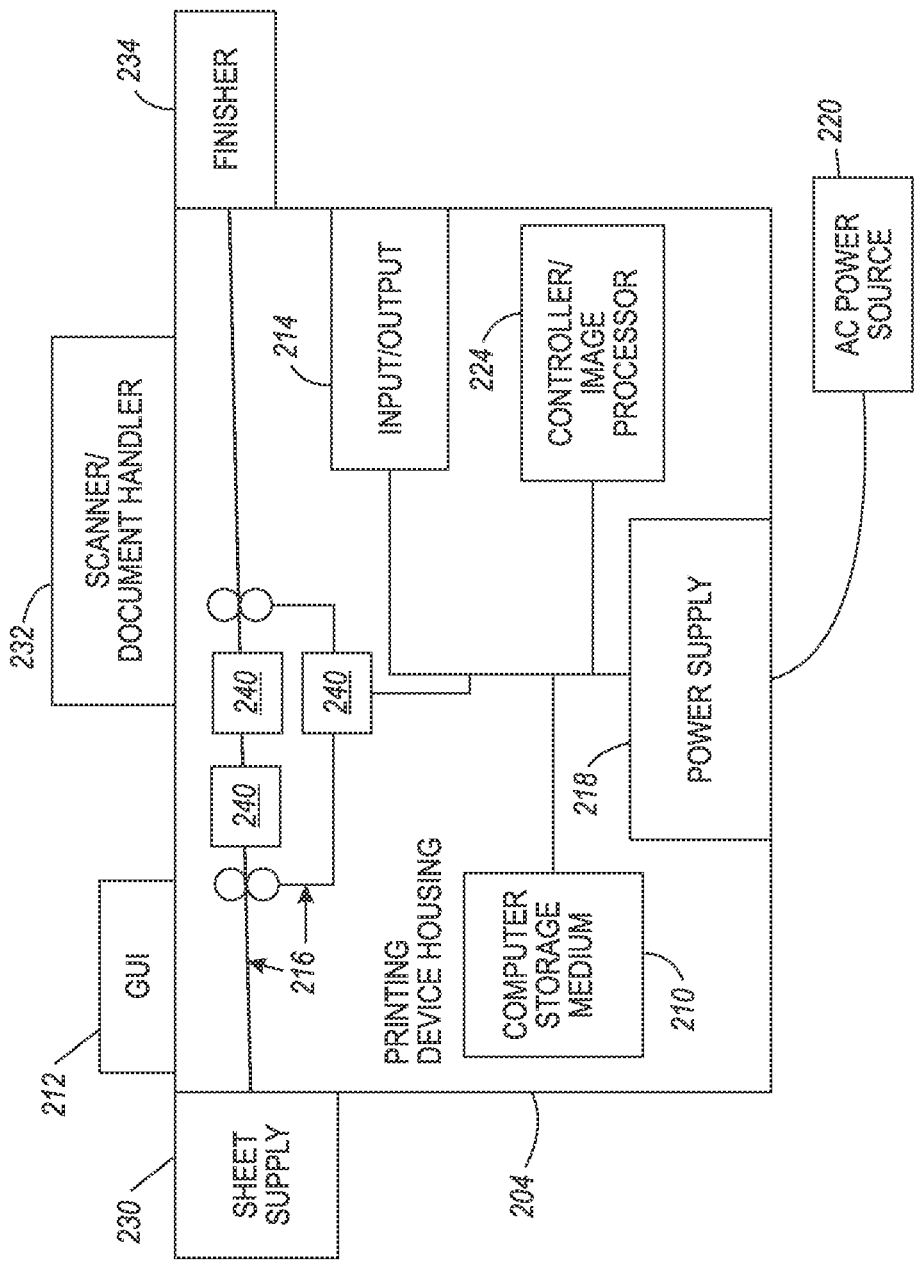
FIG. 12 is a schematic diagram illustrating printing devices herein.

FIG. 12 illustrates a printing device 204, which can be used with devices herein and can comprise, for example, a printer, copier, multi-function machine, multi-function device (MFD), etc. The printing device 204 includes a controller/tangible processor 216 and a communications port (input/output) 214 operatively connected to the tangible processor 216 and to any computerized network external to the printing device 204. Also, the printing device 204 can include at least one accessory functional component, such as a graphical user interface (GUI) assembly 212. The user may receive messages, instructions, and menu options from, and enter instructions through, the graphical user interface or control panel 212.

The input/output device 214 is used for communications to and from the printing device 204 and comprises a wired device or wireless device (of any form, whether currently known or developed in the future). The tangible processor 216 controls the various actions of the computerized device. A non-transitory, tangible, computer storage medium device 210 (which can be optical, magnetic, capacitor based, etc., and is different from a transitory signal) is readable by the tangible processor 216 and stores instructions that the tangible processor 216 executes to allow the computerized device to perform its various functions, such as those described herein. Thus, as shown in FIG. 12, a body housing has one or more functional components that operate on power supplied from an alternating current (AC) source 220 by the power supply 218. The power supply 218 can comprise a common power conversion unit, power storage element (e.g., a battery, etc), etc.

The printing device 204 includes many of the components mentioned above and at least one marking device (printing engine(s)) 240 operatively connected to a specialized image processor 224 (that is different than a general purpose computer because it is specialized for processing image data), a media path 236 positioned to supply continuous media or sheets of media from a sheet supply 230 to the marking device(s) 240, etc. After receiving various markings from the printing engine(s) 240, the sheets of media can optionally pass to a finisher 234 which can fold, staple, sort, etc., the various printed sheets. Also, the printing device 204 can include at least one accessory functional component (such as a scanner/document handler 232 (automatic document feeder (ADF)), etc.) that also operate on the power supplied from the external power source 220 (through the power supply 218).

The one or more printing engines 240 are intended to illustrate any marking device that applies a marking material (toner, inks, etc.) to continuous media or sheets of media, whether currently known or developed in the future and can include, for example, devices that use a photoreceptor belt or an intermediate transfer belt, or devices that print directly to print media (e.g., inkjet printers, ribbon-based contact printers, etc.).

As would be understood by those ordinarily skilled in the art, the printing device 204 shown in FIG. 12 is only one example and the devices herein are equally applicable to other types of printing devices that may include fewer components or more components. For example, while a limited number of printing engines and paper paths are illustrated in FIG. 12, those ordinarily skilled in the art would understand that many more paper paths and additional printing engines could be included within any printing device used with devices herein.

While some exemplary structures are illustrated in the attached drawings, those ordinarily skilled in the art would understand that the drawings are simplified schematic illustrations and that the claims presented below encompass many more features that are not illustrated (or potentially many less) but that are commonly utilized with such devices and systems. Therefore, Applicants do not intend for the claims presented below to be limited by the attached drawings, but instead the attached drawings are merely provided to illustrate a few ways in which the claimed features can be implemented.

Many computerized devices are discussed above. Computerized devices that include chip-based central processing units (CPU's), input/output devices (including graphic user interfaces (GUI), memories, comparators, tangible processors, etc.) are well-known and readily available devices produced by manufacturers such as Dell Computers, Round Rock Tex., USA and Apple Computer Co., Cupertino Calif., USA. Such computerized devices commonly include input/output devices, power supplies, tangible processors, electronic storage memories, wiring, etc., the details of which are omitted herefrom to allow the reader to focus on the salient aspects of the devices described herein. Similarly, printers, copiers, scanners and other similar peripheral equipment are available from Xerox Corporation, Norwalk, Conn., USA and the details of such devices are not discussed herein for purposes of brevity and reader focus.

Additionally, the set of devices 100 shown above includes scanners, cameras, photography equipment, facsimile machines, photo reproduction equipment, digital printing presses, xerographic devices, and the like. A scanner is used as an exemplary device above, by the devices intended to include the projector 110 include any device that optically scan images, print media, and the like, and converts the scanned image into a digitized format. Common scanning devices include variations of the flatbed scanner, where specialized image receptors 104 move beneath the platen 102 and scan the media placed on the platen 102. Modern digital scanners typically incorporate a charge-coupled device (CCD) or a contact image sensor (CIS) as the image sensing receptor(s) 104. The scanning device produces a signal of the scanned image data. Such a digital signal contains information about pixels such as color value, intensity, and their location within the scanned image.

The terms printer or printing device as used herein encompasses any apparatus, such as a digital copier, bookmaking machine, facsimile machine, multi-function machine, etc., which performs a print outputting function for any purpose. The details of printers, printing engines, etc., are well-known and are not described in detail herein to keep this disclosure focused on the salient features presented. The devices herein can encompass devices that print in color, monochrome, or handle color or monochrome image data. All foregoing devices are specifically applicable to electrostatographic and/or xerographic machines and/or processes.

In addition, terms such as "right", "left", "vertical", "horizontal", "top", "bottom", "upper", "lower", "under", "below", "underlying", "over", "overlying", "parallel", "perpendicular", etc., used herein are understood to be relative locations as they are oriented and illustrated in the drawings (unless otherwise indicated). Terms such as "touching", "on", "in direct contact", "abutting", "directly adjacent to", etc., mean that at least one element physically contacts another element (without other elements separating the described elements). Further, the terms automated or automatically mean that once a process is started (by a machine or a user), one or more machines perform the process without further input from any user.

It will be appreciated that the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims. Unless specifically defined in a specific claim itself, steps or components of the devices herein cannot be implied or imported from any above example as limitations to any particular order, number, position, size, shape, angle, color, or material.

What is claimed is:

1. A scanner comprising:
    a platen having an surface supporting items for scanning;
    a projector positioned in an interior area of said scanner adjacent said platen; and
    a graphic user interface displaying a menu of different layout characteristics of different items to be scanned,
    said menu including a front and back pages option,
    in response to selection of said front and back pages option, said projector projecting light displaying patterned alignment marks through said platen and through said items on said platen, said patterned alignment marks including a plurality of intersections of horizontal and vertical lines demarking a plurality of alignment locations for front and back pages of one of said items, said patterned alignment marks identifying an alignment position for said front and back pages of said one of said items to be located on said platen for properly aligned scanning, said projector projecting different patterned alignment marks based on different layout characteristics of different items to be scanned, and said patterned alignment marks comprising a front page alignment mark for a first translucent item adjacent a back page alignment mark for a second translucent item demarking a plurality of alignment locations on said platen.

2. The scanner according to claim 1, said patterned alignment marks including a line crossing said platen demarking a center alignment location of said items to be scanned.

3. The scanner according to claim 1, said patterned alignment marks including curved lines demarking alignment locations.

4. The scanner according to claim 1, said menu including parameter adjustments,
    a selection from said menu causing said projector to display a selected one of said patterned alignment marks adjusted for parameter adjustments.

5. The scanner according to claim 1, further comprising an optical detector adjacent said platen in a position to optically scan said items positioned on said platen for scanning, said projector not projecting said light displaying said patterned alignment marks when said optical detector optically scans said items.

6. A scanner comprising:
    a transparent platen having an exterior side and an interior side opposing each other, said exterior side of said transparent platen facing an exterior area of said scanner where translucent items are positioned for scanning, and said interior side of said transparent platen facing an interior area of said scanner;
    an optical detector adjacent said transparent platen in a position to optically scan said translucent items positioned on said transparent platen for scanning;
    a projector positioned in said interior area of said scanner adjacent said transparent platen; and
    a graphic user interface displaying a menu of different layout characteristics of different items to be scanned, said menu including a front and back pages option, in response to selection of said front and back pages option, said projector projecting human-visible light displaying patterned alignment marks through said transparent platen and through said translucent items on said exterior side of said transparent platen, said patterned alignment marks including a plurality of intersections of horizontal and vertical lines demarking a plurality of alignment locations for front and back pages of one of said translucent items, said patterned alignment marks identifying an alignment position for said front and back pages of one of said translucent items to be located on said transparent platen so as to be aligned with said optical detector for properly aligned scanning, said projector projecting different patterned alignment marks based on different layout characteristics of different translucent items to be scanned, and said patterned alignment marks comprising a front page alignment mark for a first translucent item adjacent a back page alignment mark for a second translucent item demarking a plurality of alignment locations on said platen.

7. The scanner according to claim 6, said patterned alignment marks including a line crossing said transparent platen demarking a center alignment location of said translucent items to be scanned.

8. The scanner according to claim 6, said patterned alignment marks including curved lines demarking alignment locations.

9. The scanner according to claim 6, said menu including parameter adjustments,
    a selection from said menu causing said projector to display a selected one of said patterned alignment marks adjusted for parameter adjustments.

* * * * *